(12) United States Patent
Yang et al.

(10) Patent No.: US 10,389,949 B2
(45) Date of Patent: Aug. 20, 2019

(54) METHODS AND APPARATUS FOR IMAGE PROCESSING

(71) Applicant: SZ DJI TECHNOLOGY Co., Ltd, Shenzhen (CN)

(72) Inventors: Kang Yang, Shenzhen (CN); Wei Ren, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 305 days.

(21) Appl. No.: 15/293,761

(22) Filed: Oct. 14, 2016

(65) Prior Publication Data

US 2017/0302838 A1  Oct. 19, 2017

Related U.S. Application Data

(63) Continuation of application No. PCT/CN2015/080995, filed on Jun. 8, 2015.

(51) Int. Cl.
*H04N 17/00* (2006.01)
*H04N 5/232* (2006.01)
(Continued)

(52) U.S. Cl.
CPC ......... *H04N 5/2352* (2013.01); *B64C 39/024* (2013.01); *B64D 47/08* (2013.01); *G06K 9/4604* (2013.01); *G06T 7/49* (2017.01); *G06T 7/97* (2017.01); *H04N 5/2353* (2013.01); *H04N 5/23229* (2013.01); *H04N 5/243* (2013.01); *B64C 2201/127* (2013.01); *G06K 2009/487* (2013.01); *G06T 2207/10032* (2013.01); *G06T 2207/10144* (2013.01)

(58) Field of Classification Search
CPC .... G05D 1/12; G06T 5/00; G06T 7/49; G06T 7/97; H04N 5/23254; H04N 5/2352
USPC .......................................................... 348/117
See application file for complete search history.

(56) References Cited

U.S. PATENT DOCUMENTS 6,469,734 B1  10/2002  Nichani et al.
7,199,803 B2  4/2007  Shin et al.
(Continued)

FOREIGN PATENT DOCUMENTS

CN  102750697 A  10/2012
CN  102982513 A  3/2013
(Continued)

OTHER PUBLICATIONS

International search report and written opinion dated Sep. 29, 2015 for PCT/CN2015/080995.
(Continued)

*Primary Examiner* — Patricia I Young
(74) *Attorney, Agent, or Firm* — Anova Law Group, PLLC

(57) ABSTRACT

Apparatus and methods for image processing are provided. Imaging devices may be coupled to movable objects, such as unmanned aerial vehicles (UAVs). One or more images may be captured by an imaging device, such as a camera. The one or more images may be captured under the same or different parameters. The one or more captured images may be processed for use in computer vision applications. Processing the one or more captured images may involve analyzing a texture of the images. Subsequent images may be captured under the same or different parameters.

19 Claims, 11 Drawing Sheets

(51) Int. Cl.
*H04N 5/262* (2006.01)
*G06T 5/00* (2006.01)
*G06K 7/14* (2006.01)
*G06K 9/00* (2006.01)
*H04N 5/235* (2006.01)
*H04N 5/243* (2006.01)
*G06T 7/49* (2017.01)
*G06T 7/00* (2017.01)
*B64C 39/02* (2006.01)
*B64D 47/08* (2006.01)
*G06K 9/46* (2006.01)
*G06K 9/48* (2006.01)

(56) References Cited

U.S. PATENT DOCUMENTS

| | | | |
|---|---|---|---|
| 7,627,139 B2 | 12/2009 | Marks et al. | |
| 7,760,912 B2 | 7/2010 | Dana et al. | |
| 8,432,448 B2 | 4/2013 | Hassapis et al. | |
| 9,164,506 B1 * | 10/2015 | Zang | G05D 1/0038 |
| 9,704,265 B2 * | 7/2017 | Xie | G06N 20/00 |
| 2004/0051795 A1 * | 3/2004 | Ajioka | G06K 9/00234 348/239 |
| 2012/0067956 A1 | 3/2012 | Gao et al. | |
| 2012/0133780 A1 * | 5/2012 | Zhang | H04N 17/002 348/187 |
| 2015/0138380 A1 * | 5/2015 | Tsubaki | H04N 5/144 348/208.1 |
| 2016/0110846 A1 * | 4/2016 | Park | G06T 5/00 345/589 |

FOREIGN PATENT DOCUMENTS

| | | |
|---|---|---|
| CN | 104470757 A | 3/2015 |
| WO | WO 99/57900 A1 | 11/1999 |

OTHER PUBLICATIONS

Shim, et al. Auto-adjusting Camera Exposure for Outdoor Robotics using Gradient Information. IEEE/RSJ International Conference on Intelligent Robots and Systems. Sep. 14-18, 2014.

* cited by examiner

METHODS AND APPARATUS FOR IMAGE PROCESSING

CROSS REFERENCE TO RELATED APPLICATIONS

This application is a continuation of International Application No. PCT/CN2015/080995, filed Jun. 8, 2015, the disclosure of which is hereby incorporated by reference in its entirety.

BACKGROUND

Images may be captured and processed for use in a variety of fields, for example, computer vision. In computer vision, information contained in an image can be deciphered with the aid of processors. Computer vision may aim to duplicate the abilities of human vision (e.g., recognition of objects, space, etc) by electronically perceiving physical contents of images.

Existing approaches for image acquisition and/or image processing may be less than optimal in some instances. For example, algorithms for image capture and/or processing may optimize an image for human vision (e.g., human observation), and not for computer vision. Sub-optimally captured or processed images may have detrimental effect on applications which utilize computer vision, for example, navigation of autonomous vehicles, event detection, process control, etc.

SUMMARY

Embodiments disclosed herein provide systems and methods to image capture and/or processing. In many embodiments, imaging devices may be used to collect information regarding the surrounding environment. The image data obtained from the imaging devices can be processed for use in computer vision. The suitability of use for computer vision may depend on an image texture quality. Advantageously, the approaches described herein may provide improved extraction of spatial and temporal information from image data and may be used to improve the functionality of applications which utilize the image data.

Thus, in one aspect, a method of processing an image captured by an image capture device is provided. The method comprising: receiving the image captured by the image capture device; performing, with aid of a processor, an analysis of texture of the image; and varying or maintaining a parameter of the image capture device based on the analysis of the texture to yield a desired texture quality of a subsequent image.

In some embodiments, the analysis of texture of the image includes analyzing feature points of the image. In some embodiments, the parameter is exposure time and/or gain of the image capture device. In some embodiments, the parameter of the image capture device is varied or maintained within 1 second of receiving the image. In some embodiments, varying or maintaining the parameter of the image capture device results in varying or maintaining a brightness of the subsequent image. In some embodiments, the method further comprises using the subsequent image in a computer vision process. In some embodiments, the method further comprises receiving the subsequent image captured by the image capture device using the varied or maintained parameter. In some embodiments, the varied parameter is obtained a) by applying a positive or negative predetermined offset to the parameter of the image capture device or b) by multiplying or dividing the parameter of the image capture device by a predetermined amount. In some embodiments, the method further comprises using the processor to determine how the parameter of the image capture device is to be varied or maintained. In some embodiments, the processor makes the determination using an AEC/AGC algorithm. In some embodiments, the texture of the image is analyzed using a FAST or Harris corner detection algorithm. In some embodiments, the analysis of the texture of the image includes determining a number or distribution of feature points in the image. In some embodiments, the analysis of the texture of the image includes determining a quality of feature points in the image. In some embodiments, the image capture device is on board an unmanned aerial vehicle (UAV). In some embodiments, the image capture device includes a lens configured to direct light onto an image sensor. In some embodiments, the desired texture quality includes meeting and/or exceeding a predetermined threshold condition. In some embodiments, the predetermined threshold condition is determined based on a planned use of the image or the subsequent image in a computer vision application. In some embodiments, the predetermined threshold condition includes a threshold distribution or quality of feature points.

In another aspect, an image processing apparatus is provided. The apparatus comprises: an image capture device configured to capture an image; and one or more processors, individually or collectively configured to: receive the image captured by the image capture device; perform an analysis of texture of the image; and generate a signal to vary or maintain a parameter of the image capture device based on the analysis of the texture to yield a desired texture quality of a subsequent image.

In some embodiments, the analysis of texture of the image includes an analysis of feature points of the image. In some embodiments, the parameter is exposure time and/or gain of the image capture device. In some embodiments, the parameter of the image capture device is varied or maintained within 1 second of receiving the image. In some embodiments, the signal varies or maintains a brightness of the subsequent image. In some embodiments, the subsequent image is used in a computer vision process. In some embodiments, the subsequent image is further received by the one or more processors. In some embodiments, the varied parameter is obtained a) by applying a positive or negative predetermined offset to the parameter of the image capture device or b) by multiplying or dividing the parameter of the image capture device by a predetermined amount. In some embodiments, the one or more processors determine how the parameter of the image capture device is to be varied or maintained. In some embodiments, the one or more processors makes the determination using an AEC/AGC algorithm. In some embodiments, the texture of the image is analyzed using a FAST or Harris corner detection algorithm. In some embodiments, the analysis of the texture of the image includes determining a number or distribution of feature points in the image. In some embodiments, the analysis of the texture of the image includes determining a quality of feature points in the image. In some embodiments, the image capture device is on board an unmanned aerial vehicle (UAV). In some embodiments, the image capture device includes a lens configured to direct light onto an image sensor. In some embodiments, the desired texture quality includes meeting and/or exceeding a predetermined threshold condition. In some embodiments, the predetermined threshold condition is determined based on a planned use of the image or the subsequent image in a computer vision application. In some embodiments, the predetermined threshold condition includes a threshold distribution or quality of feature points.

In another aspect, an image processor is provided. The processor is configured to: receive an image captured by an image capture device; perform an analysis of texture of the image; and generate a signal to vary or maintain a parameter of the image capture device based on the analysis of the texture to yield a desired texture quality of a subsequent image.

In some embodiments, the analysis of texture of the image includes an analysis of feature points of the image. In some embodiments, the parameter is exposure time and/or gain of the image capture device. In some embodiments, the parameter of the image capture device is varied or maintained within 1 second of receiving the image. In some embodiments, the signal varies or maintains a brightness of the subsequent image. In some embodiments, the subsequent image is used in a computer vision process. In some embodiments, the subsequent image is further received by the image processor. In some embodiments, the varied parameter is obtained a) by applying a positive or negative predetermined offset to the parameter of the image capture device or b) by multiplying or dividing the parameter of the image capture device by a predetermined amount. In some embodiments, the processor is further configured to determine how the parameter of the image capture device is to be varied or maintained. In some embodiments, the processor makes the determination using an AEC/AGC algorithm. In some embodiments, the texture of the image is analyzed using a FAST or Harris corner detect algorithm. In some embodiments, the analysis of the texture of the image includes determining a number or distribution of feature points in the image. In some embodiments, the analysis of the texture of the image includes determining a quality of feature points in the image. In some embodiments, the image capture device is on board an unmanned aerial vehicle (UAV). In some embodiments, the image capture device includes a lens configured to direct light onto an image sensor. In some embodiments, the desired texture quality includes meeting and/or exceeding a predetermined threshold condition. In some embodiments, the predetermined threshold condition is determined based on a planned use of the image or the subsequent image in a computer vision application. In some embodiments, the predetermined threshold condition includes a threshold distribution or quality of feature points.

In another aspect, a method of processing an image is provided. The method comprises: receiving a plurality of images, wherein each of the plurality of images are captured using an image capture device under conditions that vary at least one parameter of the image capture device; performing, with aid of a processor, an analysis of texture of each of the plurality of images; and selecting one or more images from said plurality based on the analyzed texture of each of the plurality of images.

In some embodiments, performing an analysis of texture of each of the plurality of images includes comprises performing an analysis of feature points of each of the plurality of images. In some embodiments, the plurality of images include at least three images. In some embodiments, the plurality of images are captured by the image capture device within 0.5 seconds. In some embodiments, the parameter is exposure time and/or gain of the image capture device, and the plurality of images are captured using different exposure times and/or different gains. In some embodiments, the at least one parameter of the image capture device is varied a) by applying a positive or negative predetermined offset to the at least one parameter of the image capture device or b) by multiplying or dividing the at least one parameter of the image capture device by a predetermined amount. In some embodiments, the selected image(s) yields a desired texture quality relative to other images of said plurality of images. In some embodiments, the method further comprises using the image capture device to capture a subsequent image using the same parameter of the image capture device that was used in capturing the selected image(s). In some embodiments, the method further comprises using the subsequent image in a computer vision process. In some embodiments, the selected image(s) meets or exceeds a predetermined threshold condition. In some embodiments, the predetermined threshold condition is determined based on a planned use of one or more of the plurality of images in a computer vision application. In some embodiments, the predetermined threshold condition includes a threshold distribution or quality of feature points. In some embodiments, the method further comprises using the processor to determine how the parameter of the image capture device is to be varied. In some embodiments, the processor makes the determination using an AEC/AGC algorithm. In some embodiments, the texture of the image is analyzed using a FAST or Harris corner detection algorithm. In some embodiments, the analysis of the texture of the image includes determining a number or distribution of feature points in the image. In some embodiments, the analysis of the texture of the image includes determining a quality of feature points in the image. In some embodiments, the image capture device is on board an unmanned aerial vehicle (UAV). In some embodiments, the image capture device includes a lens configured to direct light onto an image sensor.

In another aspect, an image processing apparatus is provided. The apparatus comprises: an image capture device configured to capture an image; and one or more processors, individually or collectively configured to: receive a plurality of images, wherein each of the plurality of images are captured using the image capture device under conditions that vary at least one parameter of the image capture device; perform an analysis of texture of each of the plurality of images; and select one or more images from said plurality based on the analyzed texture of each of the plurality of images.

In some embodiments, the analysis of texture of each of the plurality of images comprises an analysis of feature points of each of the plurality of images. In some embodiments, the plurality of images include at least three images. In some embodiments, the plurality of images are captured by the image capture device within 0.5 seconds. In some embodiments, the parameter is exposure time and/or gain of the image capture device, and the plurality of images are captured using different exposure times and/or different gains. In some embodiments, the at least one parameter of the image capture device is varied a) by applying a positive or negative predetermined offset to the at least one parameter of the image capture device or b) by multiplying or dividing the at least one parameter of the image capture device by a predetermined amount. In some embodiments, the selected image(s) yields a desired texture quality relative to other images of said plurality of images. In some embodiments, the image capture device is configured to capture a subsequent image using the same parameter of the image capture device that was used in capturing the selected image(s). In some embodiments, the subsequent image is used in a computer vision process. In some embodiments, the selected image(s) meets or exceeds a predetermined threshold condition. In some embodiments, the predetermined threshold condition is determined based on a planned use of one or more of the plurality of images in a computer vision application. In some embodiments, the predetermined threshold condition includes a threshold distribution or quality of feature points. In some embodiments, the one or more processors are configured to determine how the parameter of the image capture device is to be varied. In some embodiments, the one or more processors makes the determination using an AEC/AGC algorithm. In some embodiments, the texture of the image is analyzed using a FAST or Harris corner detection algorithm. In some embodiments, the analysis of the texture of the image includes determining a number or distribution of feature points in the image. In some embodiments, the analysis of the texture of the image includes determining a quality of feature points in the image. In some embodiments, the image capture device is on board an unmanned aerial vehicle (UAV). In some embodiments, the image capture device includes a lens configured to direct light onto an image sensor.

In another aspect, an image processor is provided. The processor is configured to: receive a plurality of images, wherein each of the plurality of images are captured using an image capture device under conditions that vary at least one parameter of the image capture device; perform an analysis of texture of each of the plurality of images; and select one or more images from said plurality based on the analyzed texture of each of the plurality of images.

In some embodiments, the processor is configured to perform an analysis of feature points of each of the plurality of images. In some embodiments, the plurality of images include at least three images. In some embodiments, the plurality of images are captured by the image capture device within 0.5 seconds. In some embodiments, the parameter is exposure time and/or gain of the image capture device, and the plurality of images are captured using different exposure times and/or different gains. In some embodiments, the at least one parameter of the image capture device is varied a) by applying a positive or negative predetermined offset to the at least one parameter of the image capture device or b) by multiplying or dividing the at least one parameter of the image capture device by a predetermined amount. In some embodiments, the selected image(s) yields a desired texture quality relative to other images of said plurality of images. In some embodiments, the image capture device is configured to capture a subsequent image using the same parameter of the image capture device that was used in capturing the selected image(s). In some embodiments, the subsequent image is used in a computer vision process. In some embodiments, the selected image(s) meets or exceeds a predetermined threshold condition. In some embodiments, the predetermined threshold condition is determined based on a planned use of one or more of the plurality of images in a computer vision application. In some embodiments, the predetermined threshold condition includes a threshold distribution or quality of feature points. In some embodiments, the processor is configured determine how the parameter of the image capture device is to be varied. In some embodiments, the processor makes the determination using an AEC/AGC algorithm. In some embodiments, the texture of the image is analyzed using a FAST or Harris corner detection algorithm. In some embodiments, the analysis of the texture of the image includes determining a number or distribution of feature points in the image. In some embodiments, the analysis of the texture of the image includes determining a quality of feature points in the image. In some embodiments, the image capture device is on board an unmanned aerial vehicle (UAV). In some embodiments, the image capture device includes a lens configured to direct light onto an image sensor.

In another aspect, a method of processing an image is provided. The method comprises: receiving an input indicative of a desired image texture quality; receiving the image captured by an image capture device; analyzing, with aid of a processor, texture of the image; and varying or maintaining a parameter of the image capture device based on the analysis of the texture to yield the desired image texture quality.

In some embodiments, analyzing texture of the image includes analyzing feature points of the image. In some embodiments, varying a parameter of the image capture device include a) applying a positive or negative predetermined offset to the parameter of the image capture device or b) multiplying or dividing the parameter of the image capture device by a predetermined amount. In some embodiments, the input indicative of the desired texture quality includes a texture quality range or value. In some embodiments, the input indicative of the desired texture quality includes an application for the image. In some embodiments, the application includes obstacle avoidance of a movable object that captures the image with aid of an image sensor on board the movable object. In some embodiments, analyzing the texture of the image includes analyzing a distribution of feature points of the image. In some embodiments, the parameter of the image capturing device is varied or maintained to yield a wider distribution of feature points when the application includes obstacle avoidance relative to other applications. In some embodiments, the application includes navigation of a movable object that captures the image with aid of an image sensor on board the movable object. In some embodiments, analyzing the texture of the image includes analyzing a quality of feature points of the image. In some embodiments, the parameter of the image capturing device is varied or maintained to yield a higher quality of feature points when the application includes navigation relative to other applications. In some embodiments, the input indicative of the desired texture quality is provided manually by a user. In some embodiments, the input indicative of the desired texture quality is generated with aid of the processor. In some embodiments, the processor is on-board a movable object.

In another aspect, an image processing apparatus is provided. The apparatus comprises: an image capture device configured to capture an image; and one or more processors, individually or collectively configured to: receive an input indicative of a desired image texture quality; receive the image captured by the image capture device; analyze texture of the image; and generate a signal to vary or maintain a parameter of the image capture device based on the analysis of the texture to yield the desired image texture quality.

In some embodiments, an analysis of texture of the image includes an analysis of feature points of the image. In some embodiments, the signal a) applies a positive or negative predetermined offset to the parameter of the image capture device or b) multiplies or divides the parameter of the image capture device by a predetermined amount. In some embodiments, the input indicative of the desired texture quality includes a texture quality range or value. In some embodiments, the input indicative of the desired texture quality includes an application for the image. In some embodiments, the application includes obstacle avoidance of a movable object that captures the image with aid of an image sensor on board the movable object. In some embodiments, an analysis of the texture of the image includes an analysis of a distribution of feature points of the image. In some embodiments, the parameter of the image capturing device is varied or maintained to yield a wider distribution of feature points when the application includes obstacle avoidance relative to other applications. In some embodiments, the application includes navigation of a movable object that captures the image with aid of an image sensor on board the movable object. In some embodiments, an analysis of the texture of the image includes an analysis of a quality of feature points of the image. In some embodiments, the parameter of the image capturing device is varied or maintained to yield a higher quality of feature points when the application includes navigation relative to other applications. In some embodiments, the input indicative of the desired texture quality is provided manually by a user. In some embodiments, the input indicative of the desired texture quality is generated with aid of a processor. In some embodiments, the processor is on-board a movable object.

In another aspect, an image processor is provided. The processor is configured to: receive an input indicative of a desired image texture quality; receive an image captured by an image capture device; analyze texture of the image; and generate a signal to vary or maintain a parameter of the image capture device based on the analysis of the texture to yield the desired image texture quality.

In some embodiments, an analysis of the texture of the image includes analyzing feature points of the image. In some embodiments, the signal a) applies a positive or negative predetermined offset to the parameter of the image capture device or b) multiplies or divides the parameter of the image capture device by a predetermined amount. In some embodiments, the input indicative of the desired texture quality includes a texture quality range or value. In some embodiments, the input indicative of the desired texture quality includes an application for the image. In some embodiments, the application includes obstacle avoidance of a movable object that captures the image with aid of an image sensor on board the movable object. In some embodiments, an analysis of the texture of the image includes analyzing a distribution of feature points of the image. In some embodiments, the parameter of the image capturing device is varied or maintained to yield a wider distribution of feature points when the application includes obstacle avoidance relative to other applications. In some embodiments, the application includes navigation of a movable object that captures the image with aid of an image sensor on board the movable object. In some embodiments, an analysis of the texture of the image includes analyzing a quality of feature points of the image. In some embodiments, the parameter of the image capturing device is varied or maintained to yield a higher quality of feature points when the application includes navigation relative to other applications. In some embodiments, the input indicative of the desired texture quality is provided manually by a user. In some embodiments, the input indicative of the desired texture quality is generated with aid of a processor. In some embodiments, the processor is on-board a movable object.

It shall be understood that different aspects of the invention can be appreciated individually, collectively, or in combination with each other. Various aspects of the invention described herein may be applied to any of the particular applications set forth below. Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
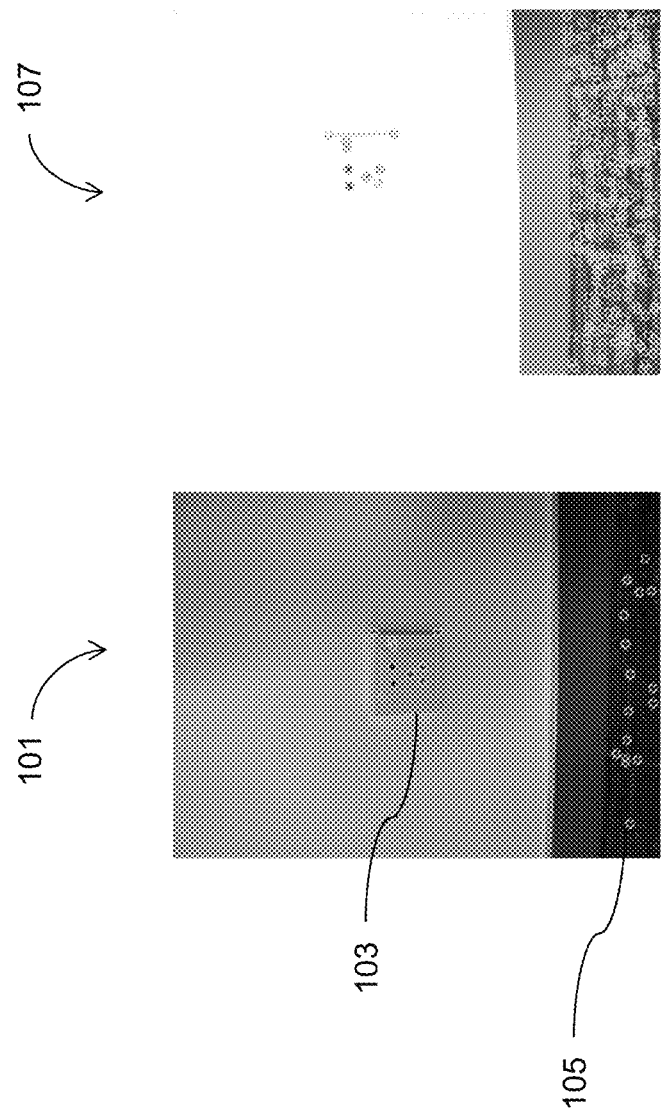
FIG. 1 illustrates feature points detected in two images taken by an imaging device operating under different parameters, in accordance with embodiments.

Image processing apparatuses and methods of processing an image are provided. The apparatuses and methods may be used in various fields, such as computer vision and for various applications, such as autonomous navigation of vehicles. In some embodiments, sensors may be used to collect relevant data. Sensors as used herein may refer to any object or device used to gather information about the environment. Sensors may be of various types (e.g., biological, optical, chemical, mechanical, etc) and may detect and/or measure objects, events, stimuli, and conditions. Both living organisms and inanimate objects may have various sensors for gathering information about the environment. For example, in humans, optical sensors (e.g., the eye) may be used to acquire up to 80% of external sensory information. In an imaging device (e.g., a camera), optical sensors (e.g., a CCD image sensor) may be used to capture images. Optical sensors may also be referred to as image sensors.

Images captured by optical sensors of imaging devices may be utilized in a variety of contexts. For example, images captured by a camera may be used by human beings for any purpose (e.g., enjoyment, evidence in a trial, etc). Alternatively or in conjunction, images captured by the optical sensors of imaging devices may be used in computer vision.

Computer vision as used herein may refer to any context in which the use of models to extract information from image data is involved. Thus, if images captured by a camera are analyzed by a processor for some purpose (e.g., scene reconstruction, event detection, video tracking, object recognition, learning, indexing, navigation, motion estimation, and image restoration), it may be being used in computer vision.

Various algorithms may be utilized to alter certain parameters of the imaging devices. Altering parameters may alter brightness and/or texture of an image captured by the imaging device. For example, automatic exposure control (AEC) or automatic gain control (AGC) on a camera may be utilized to control for brightness of captured images. Brightness may be controlled by varying the amount of light that is captured by an imaging device or artificially increasing or decreasing the light captured by the imaging device. Exposure may relate to the amount of light reaching image sensors. Gain may relate to multiplying the amount of light that have reached the image sensors. Parameters of an imaging device, such as the shutter speed or aperture of the camera may affect the amount of light that is captured by the imaging device (e.g., image sensors). Conventional AEC and AGC algorithms may set the default of the camera such that the overall brightness of a captured image is medium gray (e.g., 18% gray, 18% reflectance in visible light). An image whose overall brightness is of medium gray may be neither glaring nor dark in the context of human vision. An image whose overall brightness is of medium gray may appear natural in the context of human vision. Traditionally, one or more processors may individually or collectively execute one or more algorithms (e.g., AEC/AGC) to optimize overall brightness for human vision. Systems and methods described herein may improve or optimize captured images for computer vision. Algorithms may also be utilized to alter certain parameters of previously captured images. For example, algorithms may subject captured images to post-processing by controlling for brightness. For example, different images having different exposure for the same object may be fused to create a high-dynamic-range (HDR) image. While HDR techniques may improve the clarity of part of images for motion images, blurring may result. Additionally, for HDR techniques, specific sensors may be needed. The aforementioned algorithms may optimize images for human vision by controlling for brightness of the images.

In the context of computer vision, controlling (e.g., optimizing) for brightness may not be of primary importance. An image whose overall brightness is 18% gray may be less suited for use in computer vision than the same image whose overall brightness is, for example, 8%, 10%, 12%, 14%, 16%, 22%, 24%, or 26% gray. A more relevant parameter to control for with respect to computer vision may be a texture within an image. Texture as used herein may refer to a size and granularity, directionality and orientation, and/or regularity and randomness within an image. Texture within an image may provide information about a spatial arrangement and/or color intensities in an image. Texture may be ascertained by or have relation to feature points within an image. Texture may be comprised of texels in a regular or repeated pattern. Texture may depend on variations in pixel intensities within an image. Texture may depend on numbers feature points or quality of feature points in an image. For example, a number of edge pixels in a fixed-size region, and/or the direction of the edges may be indicative of texture in that region. The brightness and texture within an image may or may not be independent of one another. Brightness may be varied or maintained to provide a desired texture of an image.

Figure 2:
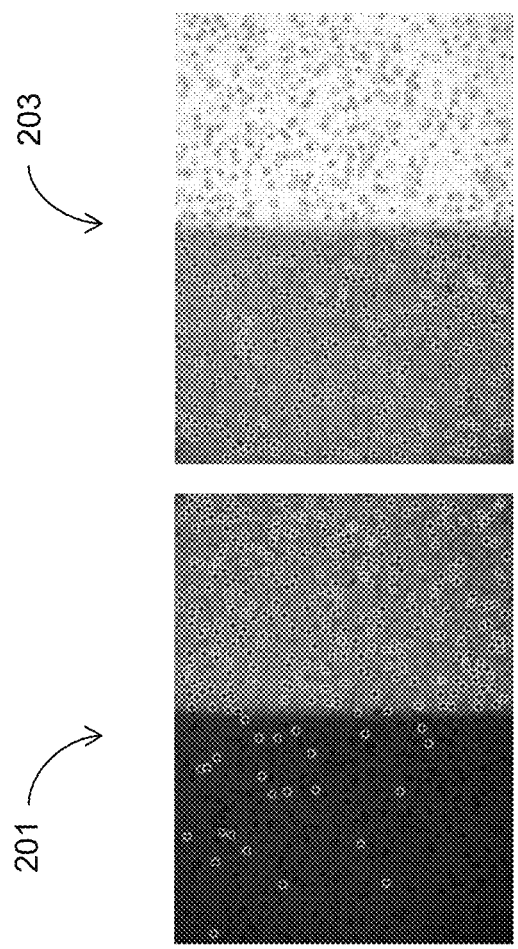
FIG. 2 illustrates feature points detected in two images taken by an imaging device operating under different parameters, in accordance with embodiments.

FIG. 1 illustrates feature points detected in two images taken by an imaging device operating with different parameters, in accordance with embodiments. The left image 101 shows an image captured using conventional AEC/AGC algorithms. The left figure may appear natural or have distinguishable features in the context of human vision. For example, a human being may be able to infer that there is an electrical outlet 103 on a wall perpendicular to a floor 105. The right image 107 shows an image captured using an algorithm optimizing for certain computer vision applications. The right figure may appear overly bright (e.g., overexposed) and without determinable features to a human. However, in the context of computer vision, the right figure may represent a superior image with more information that may be extracted and/or processed as shown by a greater number of feature points (e.g., shown as circles). In this context, image 107 may have a greater texture quality than image 101. FIG. 2 illustrates feature points detected in two images taken by an imaging device operating with different parameters, in accordance with embodiments. 201 shows an image captured using conventional AEC/AGC algorithms while 203 shows an image captured using an algorithm optimizing for certain computer vision applications. Again, it can be seen that the image captured using an algorithm optimizing for certain computer vision applications (e.g., obstacle avoidance) may contain much more feature points and may have a higher texture quality for that computer vision application than the image captured using conventional AEC/AGC algorithms.

Figure 3:
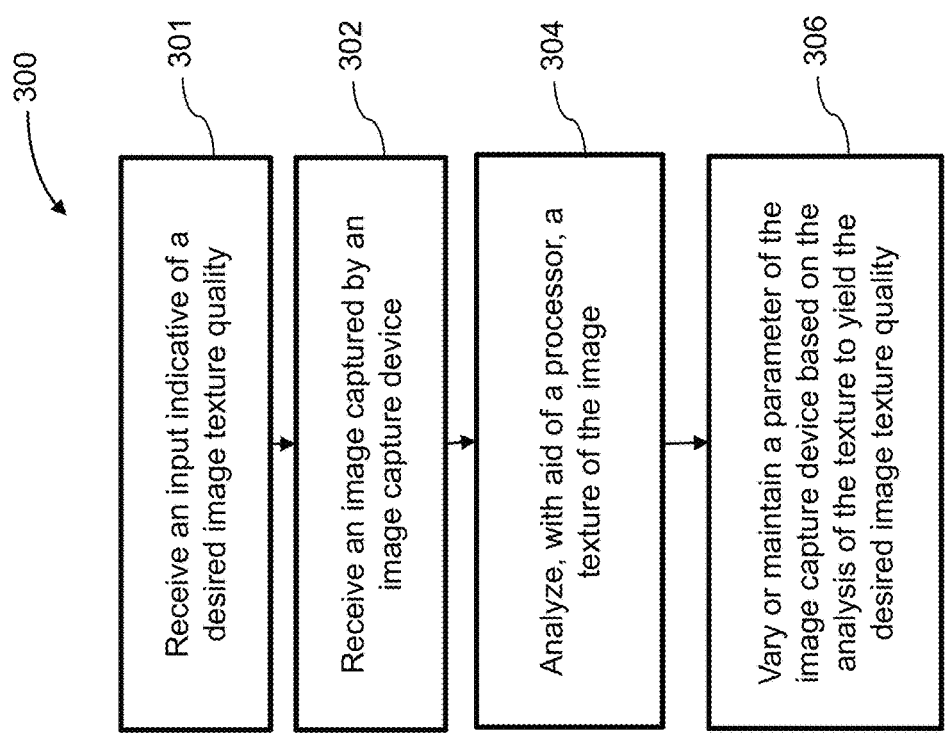
FIG. 3 illustrates a method for processing an image captured by an image capture device, in accordance with embodiments.

FIG. 3 illustrates a method for processing an image captured by an image capture device, in accordance with embodiments. An image capture device may herein be referred to as an imaging device. An imaging device can be configured to detect electromagnetic radiation (e.g., visible, infrared, and/or ultraviolet light) and generate image data based on the detected electromagnetic radiation. For example, an imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

In some embodiments, the imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like.

The imaging device may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. The camera may be a 4K camera or a camera with a higher resolution.

The imaging device may capture a sequence of images at a specific capture rate. In some embodiments, the sequence of images may be captured standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

In step 301, a processor may receive an input indicative of a desired image texture quality. The desired texture quality may be determined by the processor based on the configuration of preference. The desired texture quality may be based on user input. The desired texture quality may vary depending on external conditions (brightness of environment). The desired texture quality may be preset prior to operation of the imaging device. The desired texture quality may be updated while the imaging device is turned off. The desired texture quality may be updated while the imaging device is in operation. The desired texture quality may be stored in a memory operably coupled to a processor on or off imaging device. The desired texture quality may be downloaded from a router, from a cloud server, from an external device, or other server. The external device may be a mobile device (e.g., tablet, smartphone, remote controller) or a stationary device (e.g., computer). The desired texture quality may vary depending on the application image data may be utilized in as mentioned herein (e.g., autonomous positioning vs. obstacle avoidance).

In step 302, a processor may receive the image captured by the image capture device. In some embodiments, a processor may comprise a field-programmable gate array (FPGA), application-specific integrated circuit (ASIC), application-specific standard product (ASSP), digital signal processor (DSP), central processing unit (CPU), graphics processing unit (GPU), vision processing unit (VPU), complex programmable logic devices (CPLD), and the like. In some embodiments, the processor may be an on-board a movable object (e.g., a UAV) or an embedded processor carried by the imaging device. Alternatively, the processor may be an off-board processor separated from the imaging device (e.g., at a ground station, communicating with a camera). The algorithm may detect parameters of an imaging device. The algorithm may determine a brightness of an image. The algorithm may execute a conventional AEC algorithm. The algorithm may execute a conventional AGC algorithm. The AEC and/or AGC algorithms may control for a brightness of an image and calculate a reference exposure time and/or a gain.

In step 304, a processor may perform an analysis of a texture of the received image. The analysis may involve determining a texture quality of the image. Texture quality as used herein may refer to a suitability of the image for image processing (e.g., for use in computer vision). Images with poor texture quality not suitable for processing may provide inaccurate or inadequate data while images with high texture quality suitable for processing may provide accurate or adequate data. Texture quality may be related to, or be dependent on an image saliency. Image saliency can be used herein to refer to the extent to which images have features that are easily distinguishable or "stand out," e.g., from the background and/or surrounding image pixels. Any description herein referring to texture quality may also be applied to image saliency, and vice-versa. Texture quality may or may not be affected by the exposure level and/or contrast of the image. In some embodiments, texture quality may be determined using image gradient methods in which a gradient for each pixel in the image can be calculated and the results can be used to determine whether the image texture is sufficiently rich. An image with a richer texture may have larger gradients which may signify an image with a higher texture quality. In some embodiments, texture quality is assessed by feature detection as described below.

Image texture quality may be determined based on one or more feature points. Images captured by the imaging devices can be processed to detect one or more feature points present in the images. A feature point can be a portion of an image (e.g., an edge, corner, interest point, blob, ridge, etc.) that is uniquely distinguishable from the remaining portions of the image and/or other feature points in the image. Optionally, a feature point may be relatively invariant to transformations of the imaged object (e.g., translation, rotation, scaling) and/or changes in the characteristics of the image (e.g., brightness, exposure). A feature point may be detected in portions of an image that is rich in terms of informational content (e.g., significant 2D texture). A feature point may be detected in portions of an image that are stable under perturbations (e.g., when varying illumination and brightness of an image).

Feature detection as described herein can be accomplished using various algorithms (e.g., texture detection algorithm) which may extract one or more feature points from image data. The algorithms may additionally make various calculations regarding the feature points. For example, the algorithms may calculate a total number of feature points, or "feature point number." The algorithms may also calculate a distribution of feature points. For example, the feature points may be widely distributed within an image (e.g., image data) or a subsection of the image. For example, the feature points may be narrowly distributed within an image (e.g., image data) or a subsection of the image. The algorithms may also calculate a quality of the feature points. In some instances, the quality of feature points may be determined or evaluated based on a value calculated by algorithms mentioned herein (e.g., FAST, Corner detector, Harris, etc).

The algorithm may be an edge detection algorithm, a corner detection algorithm, a blob detection algorithm, or a ridge detection algorithm. In some embodiments, the corner detection algorithm may be a "Features from accelerated segment test" (FAST). In some embodiments, the feature detector may extract feature points and make calculations regarding feature points using FAST. In some embodiments, the feature detector can be a Canny edge detector, Sobel operator, Harris & Stephens/Plessy/Shi-Tomasi corner detection algorithm, the SUSAN corner detector, Level curve curvature approach, Laplacian of Gaussian, Difference of Gaussians, Determinant of Hessian, MSER, PCBR, or Grey-level blobs, ORB, FREAK, or suitable combinations thereof.

Texture quality may be related to feature points detected in the image. For example, the texture quality may be related to a total number of feature points in an image, distribution of feature points within an image, or a quality of feature points in an image. The determinant of texture quality may depend on a configuration of preference. The configuration of preference may relate to a specific application of computer vision an image is being used for. The configuration of preference may relate to user preference.

For example, if images received by a processor are being used in applications related to obstacle avoidance for vehicles, a distribution of feature points and/or quality of feature points within the image may determine the texture quality of the image. For example, a total number of fixed-size regions having a certain number of feature points may determine the texture quality of the image. A wide distribution of feature points in an image may signify an image having high texture quality and suited to be used in obstacle avoidance while a narrow distribution of feature points may signify an image having low texture quality and not suited to be used in obstacle avoidance. In some instances, if an image is divided into N portions (e.g., N areas of equal size), the number of portions within N portions having at least K feature points may indicate a distribution, or texture quality of the image. N and/or K may be any arbitrary number, such as about or more than 1, 2, 3, 5, 10, 50, 100, 1000, 10000, and the like. For example, if an image is divided into 25 portions, the number of portions within the 25 portions having at least 1 feature point may be used to determine a distribution, or texture quality of the image. For example, if an image is divided into 100 portions, the number of portions within the 100 portions having at least 5 feature points may be used to determine a distribution, or texture quality of the image. A wide distribution of feature points within an image may signify that no obstacles are being missed. In such a case, a small number of total feature points may be sufficient in determining obstacles, a vehicle's position, and in avoiding obstacles.

For example, if images received by a processor are being used in applications related to navigation or self-positioning of a vehicle, a quality of the feature points may indicate the texture quality of the image. In some instances, a higher quality of feature points may mean that detected feature points have been detected in an image having a greater average intensity (e.g., greyscale intensity value) compared to the an image of the same scene with a lesser average intensity. In some instances, if the images are used for self-positioning or navigation, a fewer number of feature points having a good quality may be desired and/or sufficient. For self-positioning, the parameters of the camera may be selected so that a fewer number of feature points are identified within an image. For example, an image may be overexposed such that the image is over-saturated or under-exposed such that the image is under-saturated. The fewer feature points that are nevertheless detected or identified may be higher quality than feature points that would have been identified using settings for obstacle avoidance.

The configuration of preference may be received by the processor. The configuration of preference may be determined in real time by a processing unit coupled to the processor. The configuration of preference may be based on user input, may be preset prior to operation of the imaging device, be updated while the imaging device is turned off, be updated while the imaging device is in operation. The configuration of preference may be stored in a memory operably coupled to a processor on or off the imaging device. The configuration of preference may be downloaded from a router, from a cloud server, from an external device, or other server. The external device may be a mobile device (e.g., tablet, smartphone, remote controller) or a stationary device (e.g., computer).

In step 306, the processor may vary or maintain a parameter of the image capture device based on the analysis of the texture to yield a desired texture quality of a subsequent image. The image device maintaining or varying the parameter of the image capture device may result in varying or maintaining a brightness of subsequent images. The desired texture quality may be determined by the processor based on the configuration of preference. The desired texture quality may be based on user input. The desired texture quality may be preset prior to operation of the imaging device. The desired texture quality may be updated while the imaging device is turned off The desired texture quality may be updated while the imaging device is in operation. The desired texture quality depend on external factors (e.g., night time vs daytime, average brightness of an area, etc). The desired texture quality may depend on an average texture quality of one or more previously received images. The desired texture quality may be stored in a memory operably coupled to a processor on or off imaging device. The desired texture quality may be downloaded from a router, from a cloud server, from an external device, or other server. The external device may be a mobile device (e.g., tablet, smartphone, remote controller) or a stationary device (e.g., computer). The desired texture quality may vary depending on the application image data may be utilized in as mentioned herein (e.g., autonomous positioning vs. obstacle avoidance). Whether the received image has a desired texture quality may determine whether the processor should vary or maintain a parameter of the image capture device.

The processor may generate a signal to maintain or vary (e.g., adjust) at least one parameter of the imaging device (e.g., EXPO) such that a new reference parameter is determined (e.g., new reference exposure time, new gain, etc). The processor may maintain or vary the parameter of the image capture device within about 0.005, 0.01, 0.05, 0.1, 0.5, 1, 2, 4, or 10 seconds of receiving the image. The new reference parameter may differ in at least one parameter compared to the old reference parameter. The processor may automatically determine how to adjust the parameters of the imaging device such that a higher quality texture image may be obtained. For example, if an image not meeting the desired texture quality was captured using a parameter EXPO, steps 301 through 306 may be repeated but with a different parameter, for example EXPO*2, EXPO*3, EXPO*4, etc. If an image captured using the parameter EXPO*2 yielded an image having a texture quality lower than that captured using parameter EXPO, steps 301 through 306 may be repeated using a different parameter, for example EXPO/2, EXPO/3, EXPO/4, etc. The process may be repeated until an image having a desired texture quality is acquired. It is to be understood that the relationship between the differing parameters may be of any kind (e.g., multiplicative, divisional, additional, etc) and that there may be no mathematical relationship among the differing parameters. The at least one parameter of the image capture device may be varied by applying a positive or negative predetermined offset to the adjustable parameter of the image capture device. For example, the shutter speed, aperture, and/or gain of the image capture device may be decreased or increased to capture the subsequent image.

Once an image having a desired texture quality is acquired, it may be output to a processor to be used in a computer vision process (e.g., for autonomous positioning of vehicles). Subsequent images may be acquired using the parameters utilized to acquire the image having a desired texture quality. The subsequent images may be output to a processor to be used in a computer vision process (e.g., for autonomous positioning of vehicles). The output may be an image, texture information of the image, or synthesized texture information of the image. In some embodiments, a processor utilized in a computer vision process may be separate from the processor analyzing the image for texture information and/or processor controlling the parameters of the image capture device (e.g., processor executing AEC/AGC algorithms). In some embodiments a processor utilized in a computer vision process may be the same processor analyzing the image for texture information and/or processor controlling the parameters of the image capture device. The systems and methods provided herein may include one or more processors that individually or collectively perform any of the steps mentioned herein.

Method 300 may be repeated at a desired rate. For example, method 300 may be repeated for every image captured by the imaging device. In some embodiments, method 300 may be repeated for every few images captured by the imaging device. For example, method 300 may be repeated for every 2, 3, 4, 5, 10, 15, 20, 50, 100 images captured by the imaging device. Alternatively, the image capture rate may be independent of the rate at which method 300 is repeated. The rate may be less than or equal to about 0.005 seconds, 0.002 seconds, 0.05 seconds, 0.01 seconds, 0.02 seconds, 0.05 seconds. 0.1 seconds, 0.2 seconds, 0.5 seconds, 1 second, 2 seconds, 5 seconds, 10 seconds, 20 seconds, 50 seconds, 100 seconds, 200 seconds, 500 seconds, 1000 seconds, or 3600 seconds. Thus, for example, while images may be captured by the imaging device every 0.05 seconds as mentioned herein, method 300 may be repeated only every 10 seconds. Alternatively, or in conjunction, steps method 300 may be repeated in response to an external event or condition. A detector may detect a luminance of the external environment. If the luminance passes a certain threshold, the detector may send a signal to the one or more processors which may trigger method 300 to be repeated.

Figure 4:
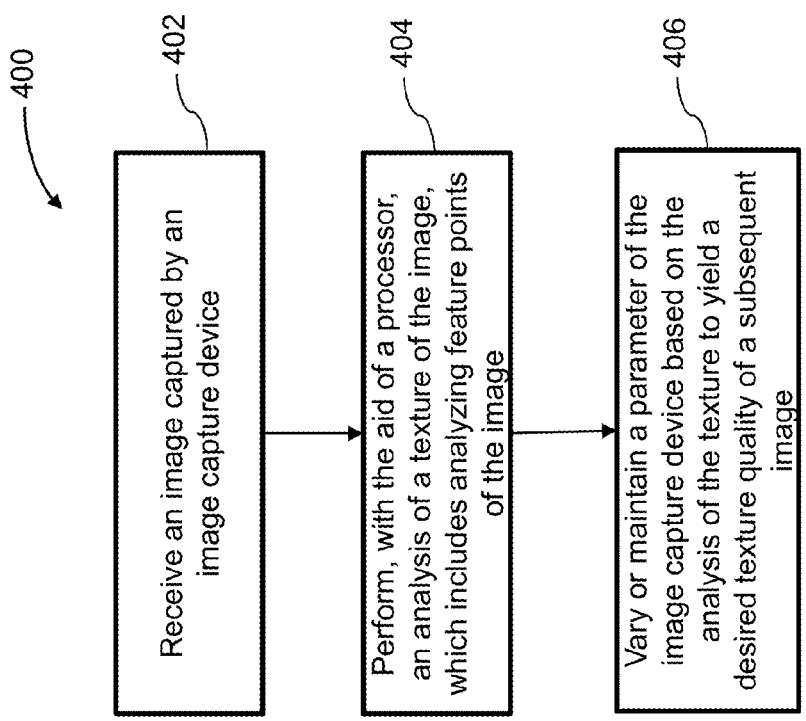
FIG. 4 illustrates a method for processing feature points within an image captured by an image capture device, in accordance with embodiments.

FIG. 4 illustrates a method for processing feature points within an image captured by an image capture device, in accordance with embodiments. For method 400, a desired texture quality may be preset and may involve no step of receiving an input indicative of a desired image texture quality. The desired texture quality may be as previously described herein. For example, the desired texture quality may be determined by the processor based on the configuration of preference. The desired texture quality may vary depending on external conditions (brightness of environment). The desired texture quality may be preset prior to operation of the imaging device. The desired texture quality may be updated while the imaging device is turned off. The desired texture quality may be updated while the imaging device is in operation. The desired texture quality may be stored in a memory operably coupled to a processor on or off imaging device. The desired texture quality may be downloaded from a router, from a cloud server, from an external device, or other server. In step 402, a processor may receive an image captured by an image capture device, substantially as described in step 302. In step 404, a processor may perform an analysis of the image, which includes analyzing feature points of the image, substantially as described in step 304. In step 406, the processor may vary or maintain a parameter of the image capture device based on the analysis of the texture to yield a desired texture quality of a subsequent image, substantially as described in step 306. Method 400 may be repeated at a desired rate, substantially as described for method 300.

Figure 5:
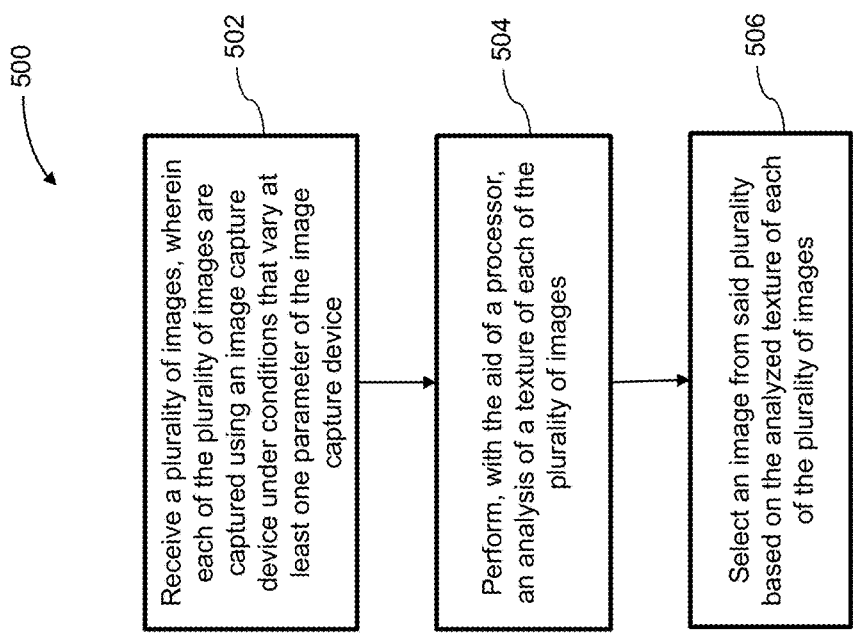
FIG. 5 illustrates a method of processing a plurality of images, in accordance with embodiments.

FIG. 5 illustrates a method of processing a plurality of images, in accordance with embodiments. In step 502, a processor may receive a plurality of images. The plurality of images may be about or more than 2, 3, 4, 5, 6, 7, 8, 9, 10, 15, 20, 30, 40, or 50 images. The plurality of images may be substantially simultaneously captured or be captured over time. The plurality of images may include images of the same or substantially similar scene. The plurality of images may include images of the same or substantially similar field of view (FOV). The field of view of an imaging device may be the extent of the environment that is detectable (e.g., visible) by the imaging device. The field of view may be related to the angle of view, which may be measured by the angular extent of a given scene that is imaged by the imaging device. The angle of view of an imaging device may be at an angle of less than or about 360°, 300°, 240°, 180°, 120°, 60°, 30°, 20°, 10°, 5°, or 1°. The plurality of images may be captured using an image capture device at a specific capture rate. In some embodiments, the images may be captured at standard video frame rates such as about 24p, 25p, 30p, 48p, 50p, 60p, 72p, 90p, 100p, 120p, 300p, 50i, or 60i. In some embodiments, the images may be captured at a rate less than or equal to about once every 0.0001 seconds, 0.0002 seconds, 0.0005 seconds, 0.001 seconds, 0.002 seconds, 0.005 seconds, 0.002 seconds, 0.05 seconds, 0.01 seconds, 0.02 seconds, 0.05 seconds. 0.1 seconds, 0.2 seconds, 0.5 seconds, 1 second, 2 seconds, 5 seconds, or 10 seconds.

The plurality of images may be captured using an image capture device under conditions that vary at least one parameter of the image capture device. In some embodiments, multiple parameters, such as 2, 3, 4, 5 or more parameters may be varied. The parameters may be as described herein (e.g., exposure time or gain). For example, the parameter to be varied may be an exposure time of the image capture device and the plurality of images may be captured using different exposure times. For example, the parameter to be varied may be a gain of the image capture device, and the plurality of images may be captured using different gains. For example, two parameters to be varied may be an exposure (e.g., shutter speed or aperture) and gain. It is to be understood that the relationship between the varied parameter may be of any kind (e.g., multiplicative, divisional, additional, etc) and that there may be no mathematical relationship among the varied parameter. Thus, if the plurality of images contains three images, the three images may have been captured under a reference exposure and reference gain, 2*the reference exposure and ½*the reference gain, and 3*the reference exposure and ¼*the reference gain. Alternatively, in some embodiments, if the plurality of images contains three images, the three images may have been captured under EXPO/2, EXPO, or EXPO*2, where EXPO is a varied parameter and as described herein. The at least one parameter of the image capture device may be varied by applying a positive or negative predetermined offset to the adjustable parameter of the image capture device. The predetermined offset may be a shutter speed, aperture, and/or gain of the image capture device.

In step 504, a processor may perform an analysis of a texture of each of the plurality of images received in step 502. The analysis may be as previously described (e.g., analyzing feature points of each of the plurality of images). In step 506, the processor may select an image from the plurality of images based on the analyzed texture of each of the plurality of images. The processor may select an image having a preferable texture quality out of the plurality of images. For example, the preferable texture quality may be an image having the highest texture quality, an image having the highest total number of feature points within an image, an image having a feature point number falling in a desired range, an image having an uneven, predefined, and/or recognizable distribution and/or pattern of feature points, etc. The selected image may yield a desired texture quality relative to other images of the plurality of images. The processor may also additionally compare the image having the preferable texture quality against a desired texture quality as described herein (e.g., absolute desired texture quality). The image having the preferable texture quality may be output to be used in a computer vision process. The output may be the image itself, texture information of the image, or synthesized texture information of the image. The processor may apply the parameters used in capturing the image having the preferable texture quality to the image capture device in order to capture subsequent images. For example, subsequent images may be captured using the same exposure and/or gain. The determinant of texture quality and/or desired texture quality may depend on a specific application of computer vision an image is being used for, or a configuration of preference as described herein.

Subsequently captured images may be output to a processor to be used in a computer vision process. The output may be the subsequently captured image(s), texture information of the subsequently captured image(s), or synthesized texture information of the subsequently captured image(s). Alternatively or in conjunction, the parameters used to capture the image having the preferable texture quality may be applied to previously captured images (e.g., the non-selected images within the plurality of images) and be output to a processor to be used in a computer vision process. In some embodiments, a processor utilized in a computer vision process may be separate from the processor analyzing the image for texture information and/or processor controlling the parameters of the image capture device (e.g., processor executing AEC/AGC algorithms). In some embodiments a processor utilized in a computer vision process may be the same processor analyzing the image for texture information and/or processor controlling the parameters of the image capture device.

Steps 502 through 506 may be repeated at a desired rate. The rate may be less than or equal to about 0.005 seconds, 0.002 seconds, 0.05 seconds, 0.01 seconds, 0.02 seconds, 0.05 seconds. 0.1 seconds, 0.2 seconds, 0.5 seconds, 1 second, 2 seconds, 5 seconds, 10 seconds, 20 seconds, 50 seconds, 100 seconds, 200 seconds, 500 seconds, 1000 seconds, or 3600 seconds. The rate at which method 500 is repeated may or may not be related to the image capture rate of the imaging device.

In some embodiments, sensors and/or processors may be coupled with movable objects. Movable objects may be an unmanned movable object, such as an unmanned aerial vehicle. In some embodiments, the sensors may comprise imaging devices such as cameras. One or more imaging devices may be carried by a UAV. Any description herein of UAVs may apply to any other type of movable objects as desired. In some embodiments, the processor may be an embedded processor carried by the UAV. Alternatively, the processor may be separated from the UAV (e.g., at a ground station, communicating with the UAV or a movable remote controller communicating with the UAV). The UAV may utilize the imaging devices as described herein to carry out operations (e.g., in the context of computer vision). For example, the processors on the UAV may analyze the images captured by the imaging devices and use them in self-positioning applications and/or obstacle avoidance applications. The UAV may utilize computer vision to self-navigate within an environment. Self-navigation may include determining a local or global location of the UAV, orientation of the UAV, detection and avoidance of obstacles, and the like. Imaging devices of the present disclosure can be situated on any suitable portion of the UAV, such as above, underneath, on the side(s) of, or within a vehicle body of the UAV. Some imaging devices can be mechanically coupled to the UAV such that the spatial disposition and/or motion of the UAV correspond to the spatial disposition and/or motion of the imaging device. The imaging devices can be coupled to the UAV via a rigid coupling, such that the imaging device does not move relative to the portion of the UAV to which it is attached. Alternatively, the coupling between the imaging device and the UAV can permit movement (e.g., translational or rotational movement relative to the UAV) of the imaging device relative to the UAV. The coupling can be a permanent coupling or non-permanent (e.g., releasable) coupling. Suitable coupling methods can include adhesives, bonding, welding, and/or fasteners (e.g., screws, nails, pins, etc.). Optionally, the imaging device can be integrally formed with a portion of the UAV. Furthermore, the imaging device can be electrically coupled with a portion of the UAV (e.g., processing unit, control system, data storage) so as to enable the data collected by the imaging device to be used for various functions of the UAV (e.g., navigation, control, propulsion, communication with a user or other device, etc.), such as the embodiments discussed herein. The imaging device may be operably coupled with a portion of the UAV (e.g., processing unit, control system, data storage). One or more imaging devices may be situated on the UAV. For example, 1, 2, 3, 4, 5 or more imaging devices may be situated on the UAV. The one or more imaging devices may have the same FOV or a different FOV. Each of the one or more imaging devices may be coupled to one or more processors. Each of the one or more imaging devices may individually or collectively perform the methods mentioned herein. The one or more imaging devices may capture images each with a different desired texture quality. The one or more imaging devices may capture images each with a same desired texture quality. Each imaging device may capture images what are utilized for the same or different function (e.g., computer vision application). For example, a UAV may be coupled with two imaging devices, one which captures images that are utilized for obstacle avoidance, and another that captures images that are utilized for navigation or self-positioning.

Figure 6:
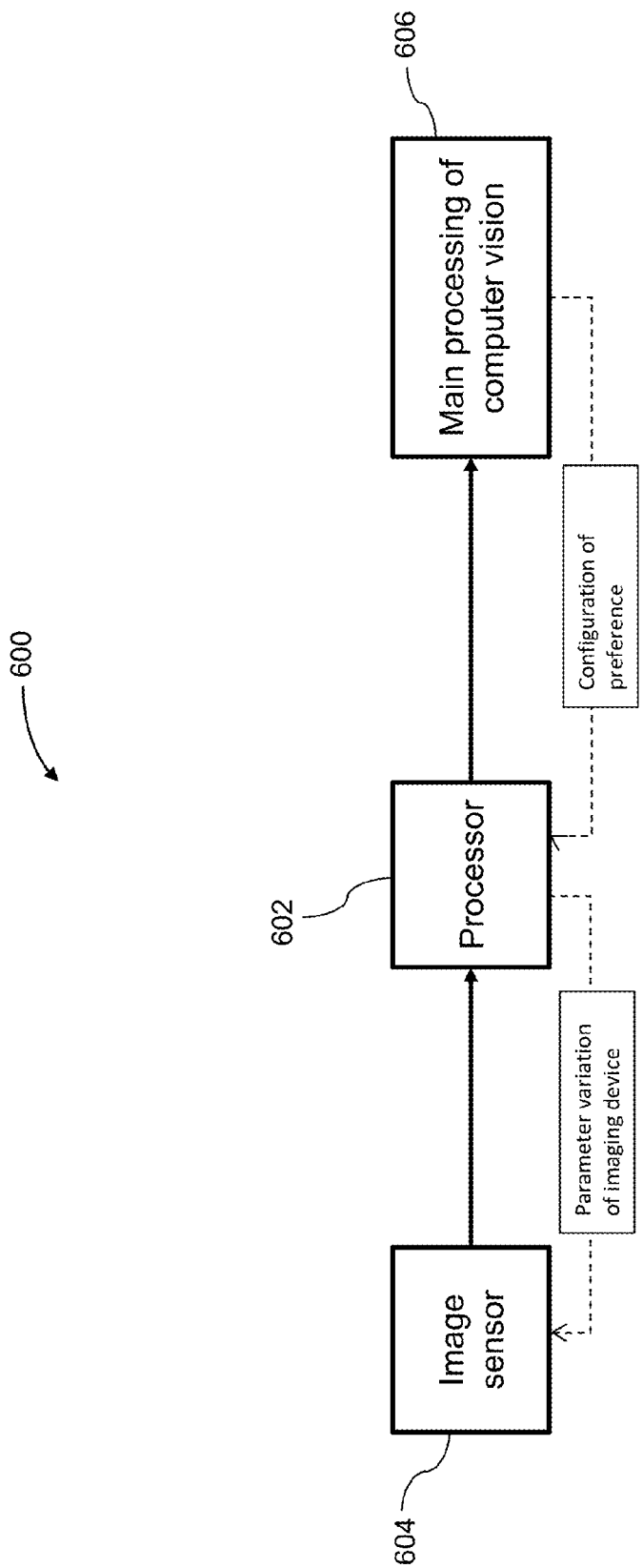
FIG. 6 illustrates a configuration of a texture detecting algorithm utilized in the context of computer vision, in accordance with embodiments.

FIG. 6 illustrates a configuration of a texture detecting algorithm utilized in the context of computer vision, in accordance with embodiments. Configuration 600 can be performed using any embodiment of the apparatus and methods described herein.

One or more processors 602 (e.g., FPGA) may be coupled to one or more image sensors 604 embedded in an imaging device. The processors may be embedded in an imaging device or may be separate from the imaging device. The processors may include algorithms for controlling parameters (e.g., exposure, gain) of the imaging device. The algorithms for controlling parameters of the imaging device may be conventional AEC/AGC algorithms as described herein. The processors may output a reference exposure and gain configuration to be adapted by the imaging device for the acquisition of images. For example, the imaging device may vary the exposure time and amount by varying the shutter time or aperture size.

The image sensor 604, such as a CMOS or CCD sensor, may generate electrical signals in response to wavelength of light hitting the sensors. The image sensors may be a part of the imaging devices as described herein. The electrical signals generated may contain image information. The image information may be sent to the one or more processors 602. The image information may vary depending on the configuration of the parameters (e.g., exposure and gain) even under identical external conditions (e.g., identical lighting, location, etc). The one or more processors may include a texture detecting algorithm. The texture detecting algorithm may analyze an image or a plurality of images for texture quality as described herein (e.g., by determining a feature point number). The one or more processors may compare the texture information amongst the plurality of images and/or may compare the texture information against a desired texture quality (e.g., a threshold total feature point number within the image). Whether to compare the texture information amongst the plurality of images, whether to compare the texture information against a desired texture quality, and the desired texture quality may depend on a configuration of preference output by a computer vision processing unit 606. In some instances, the configuration of preference may depend on computer vision applications to be utilized. The computer vision processing unit may determine an application in which an image or images may be used for (e.g., self-positioning or obstacle avoidance of vehicles) and relay the information to the one or more processors which may then compare the texture information amongst the plurality of images and/or determine a desired texture quality and compare the texture information against a desired texture quality. The computer vision processing unit may or may not comprise the one or more processors 602. The computer vision processing unit may be on board the imaging device. The computer vision processing unit may be on a movable vehicle such as a UAV. The computer vision processing unit may be on a ground communicating with a camera and/or a UAV.

Based on the comparison, the one or more processors may maintain or adjust algorithms controlling for the parameters of the imaging device (e.g., AEC/AGC). Subsequent images may be acquired using the maintained or adjusted parameters. Subsequent images may be sent to the computer vision processing unit to be processed and be used for computer vision applications. Alternatively or in conjunction, the maintained or adjusted parameters may be applied to previously acquired images which may then be output to a processor to be used in computer vision applications.

The image data output to the computer vision processing unit may be assessed and be used as a basis for accomplishing various operations. For instance, the information assessed from the image data can be used as a basis for outputting signals to cause a UAV to navigate within the environment. The signal can include control signals for the propulsion system (e.g., rotors) of the UAV for effecting movement of the vehicle. The signal can cause the UAV to avoid obstacles and/or cause the UAV to position itself autonomously within an environment. The apparatuses and methods disclosed herein can improve the field of computer vision and may improve UAV navigation, thereby enhancing the robustness and flexibility of UAV functionalities such as navigation and obstacle avoidance.

The embodiments provided herein can be applied to various types of UAVs. For instance, the UAV may be a small-scale UAV that weighs no more than 10 kg and/or has a maximum dimension of no more than 1.5 m. In some embodiments, the UAV may be a rotorcraft, such as a multi-rotor aircraft that is propelled to move through the air by a plurality of propellers (e.g., a quadcopter). Additional examples of UAVs and other movable objects suitable for use with the embodiments presented herein are described in further detail below.

The UAVs described herein can be operated completely autonomously (e.g., by a suitable computing system such as an onboard controller), semi-autonomously, or manually (e.g., by a human user). The UAV can receive commands from a suitable entity (e.g., human user or autonomous control system) and respond to such commands by performing one or more actions. For example, the UAV can be controlled to take off from the ground, move within the air (e.g., with up to three degrees of freedom in translation and up to three degrees of freedom in rotation), move to target location or to a sequence of target locations, hover within the air, land on the ground, and so on. As another example, the UAV can be controlled to move at a specified velocity and/or acceleration (e.g., with up to three degrees of freedom in translation and up to three degrees of freedom in rotation) or along a specified movement path. Furthermore, the commands can be used to control one or more UAV components, such as the components described herein (e.g., sensors, actuators, propulsion units, payload, etc.). For instance, some commands can be used to control the position, orientation, and/or operation of a UAV payload such as a camera. Optionally, the UAV can be configured to operate in accordance with one or more predetermined operating rules. The operating rules may be used to control any suitable aspect of the UAV, such as the position (e.g., latitude, longitude, altitude), orientation (e.g., roll, pitch yaw), velocity (e.g., translational and/or angular), and/or acceleration (e.g., translational and/or angular) of the UAV. For instance, the operating rules can be designed such that the UAV is not permitted to fly beyond a threshold height, e.g., the UAV can be configured to fly at a height of no more than 400 m from the ground. In some embodiments, the operating rules can be adapted to provide automated mechanisms for improving UAV safety and preventing safety incidents. For example, the UAV can be configured to detect a restricted flight region (e.g., an airport) and not fly within a predetermined distance of the restricted flight region, thereby averting potential collisions with aircraft and other obstacles.

Figure 7:
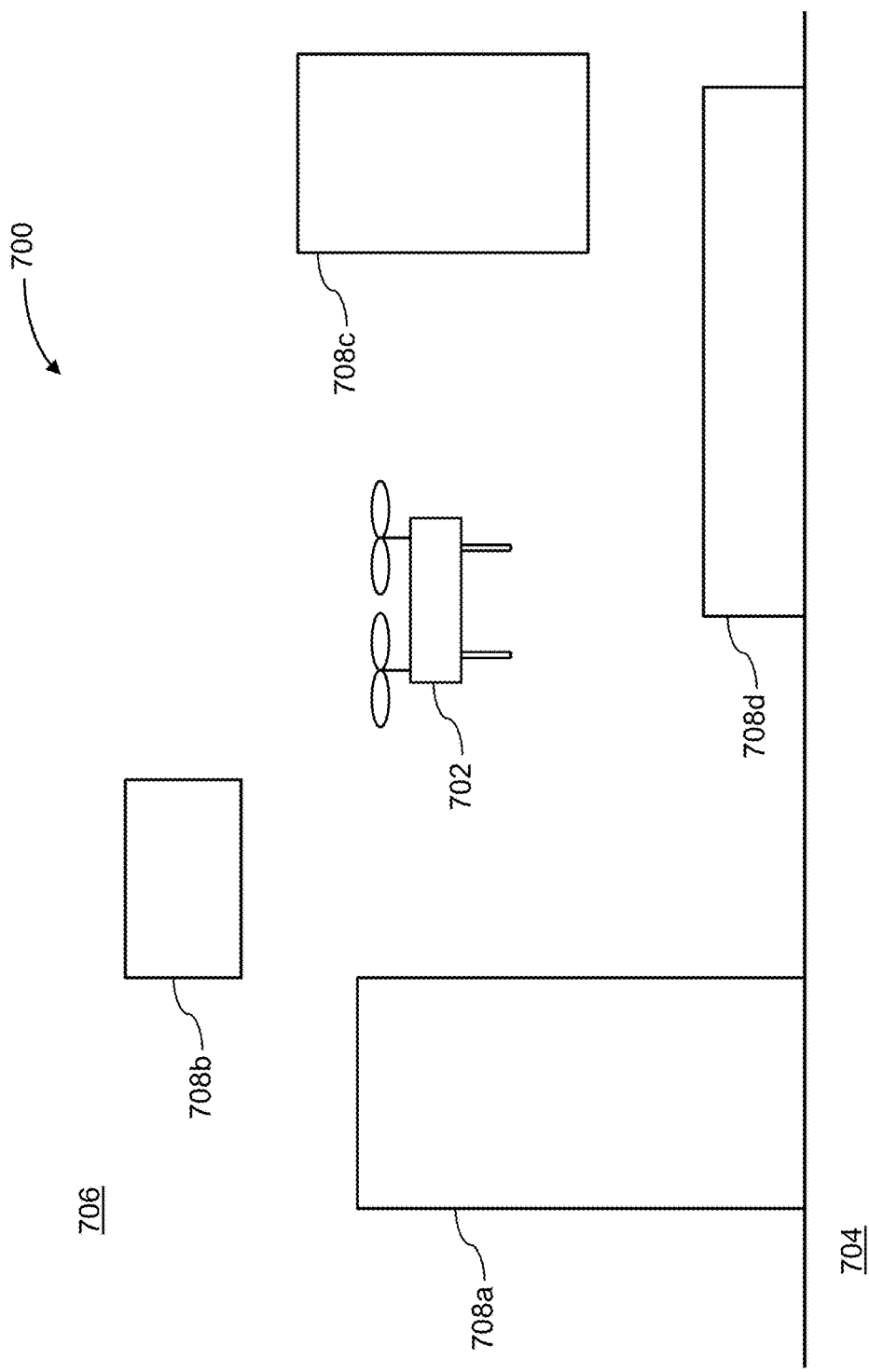
FIG. 7 illustrates a UAV operating in an outdoor environment, in accordance with embodiments.

FIG. 7 illustrates a UAV 702 operating in an outdoor environment 700, in accordance with embodiments. The outdoor environment 700 may be an urban, suburban, or rural setting, or any other environment that is not at least partially within a building. The UAV 702 may be operated relatively close to the ground 704 (e.g., low altitude) or relatively far from the ground 704 (e.g., high altitude). For example, a UAV 702 operating less than or equal to approximately 10 m from the ground may be considered to be at low altitude, while a UAV 702 operating at greater than or equal to approximately 10 m from the ground may be considered to be at high altitude.

In some embodiments, the outdoor environment 700 includes one or more obstacles 708a-d. An obstacle may include any object or entity that may obstruct the movement of the UAV 702. Some obstacles may be situated on the ground 704 (e.g., obstacles 708a, 708d), such as buildings, ground vehicles (e.g., cars, motorcycles, trucks, bicycles), human beings, animals, plants (e.g., trees, bushes), and other manmade or natural structures. Some obstacles may be in contact with and/or supported by the ground 704, water, manmade structures, or natural structures. Alternatively, some obstacles may be wholly located in the air 706 (e.g., obstacles 708b, 708c), including aerial vehicles (e.g., airplanes, helicopters, hot air balloons, other UAVs) or birds. Aerial obstacles may not be supported by the ground 704, or by water, or by any natural or manmade structures. An obstacle located on the ground 704 may include portions that extend substantially into the air 706 (e.g., tall structures such as towers, skyscrapers, lamp posts, radio towers, power lines, trees, etc.).

Figure 8:
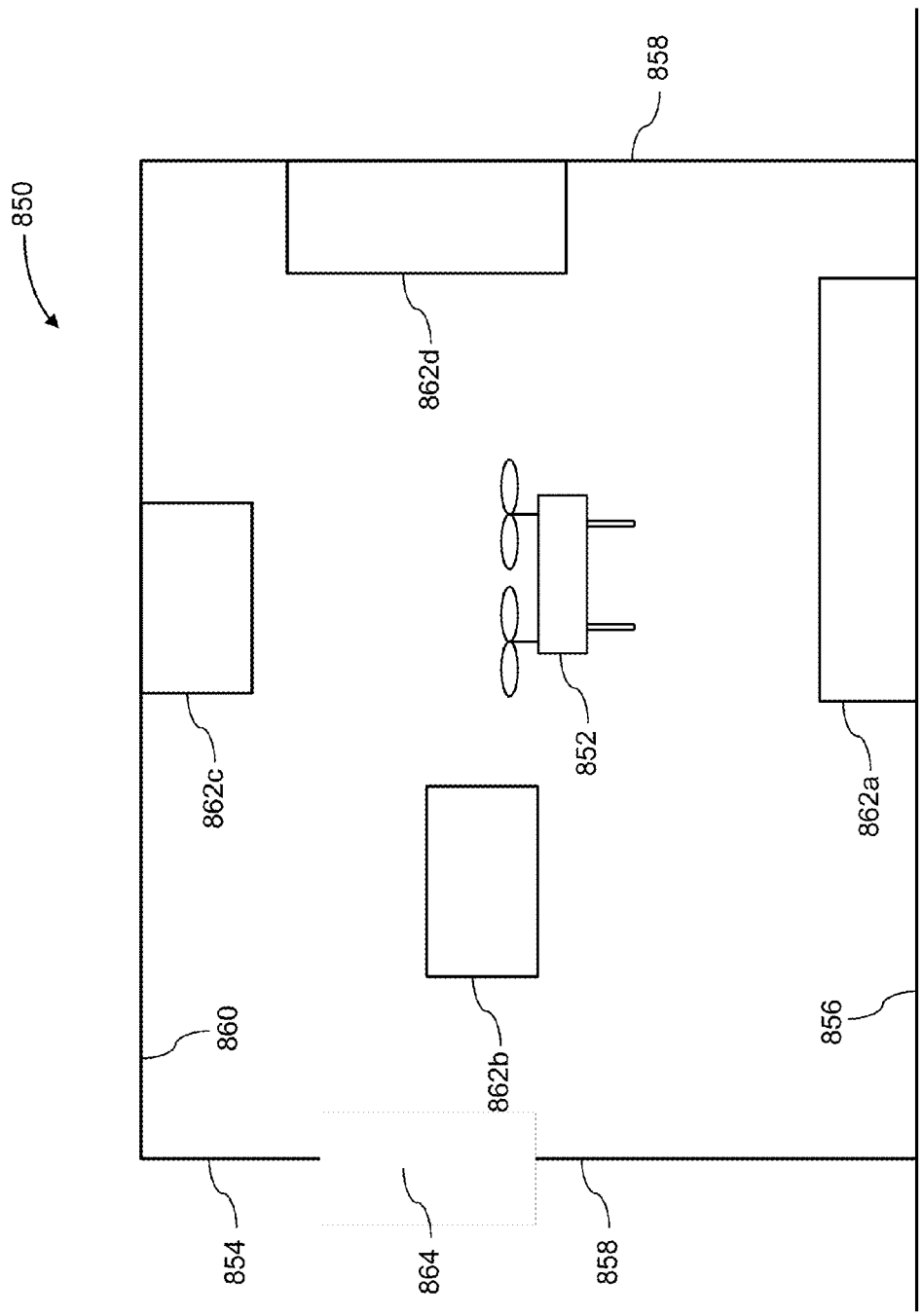
FIG. 8 illustrates a UAV operating in an indoor environment, in accordance with embodiments.

FIG. 8 illustrates a UAV 852 operating in an indoor environment 850, in accordance with embodiments. The indoor environment 850 is within the interior of a building 854 having a floor 856, one or more walls 858, and/or a ceiling or roof 860. Exemplary buildings include residential, commercial, or industrial buildings such as houses, apartments, offices, manufacturing facilities, storage facilities, and so on. The interior of the building 854 may be completely enclosed by the floor 856, walls 858, and ceiling 860 such that the UAV 852 is constrained to the interior space. Conversely, at least one of the floor 856, walls 858, or ceiling 860 may be absent, thereby enabling the UAV 852 to fly from inside to outside, or vice-versa. Alternatively or in combination, one or more apertures 864 may be formed in the floor 856, walls 858, or ceiling 860 (e.g., a door, window, skylight).

Similar to the outdoor environment 700, the indoor environment 850 can include one or more obstacles 862a-d. Some obstacles may be situated on the floor 856 (e.g., obstacle 862a), such as furniture, appliances, human beings, animals, plants, and other manmade or natural objects. Conversely, some obstacles may be located in the air (e.g., obstacle 862b), such as birds or other UAVs. Some obstacles in the indoor environment 850 can be supported by other structures or objects. Obstacles may also be attached to the ceiling 860 (e.g., obstacle 862c), such as light fixtures, ceiling fans, beams, or other ceiling-mounted appliances or structures. In some embodiments, obstacles may be attached to the walls 858 (e.g., obstacle 862d), such as light fixtures, shelves, cabinets, and other wall-mounted appliances or structures. Notably, the structural components of the building 854 can also be considered to be obstacles, including the floor 856, walls 858, and ceiling 860.

The obstacles described herein may be substantially stationary (e.g., buildings, plants, structures) or substantially mobile (e.g., human beings, animals, vehicles, or other objects capable of movement). Some obstacles may include a combination of stationary and mobile components (e.g., a windmill). Mobile obstacles or obstacle components may move according to a predetermined or predictable path or pattern. For example, the movement of a car may be relatively predictable (e.g., according to the shape of the road). Alternatively, some mobile obstacles or obstacle components may move along random or otherwise unpredictable trajectories. For example, a living being such as an animal may move in a relatively unpredictable manner.

In order to ensure safe and efficient operation, it may be beneficial to provide the UAV with mechanisms for assessing environmental information such as the locations of objects in the surrounding environment and its state information such as position, velocity, attitude, and acceleration. Additionally, accurate assessment of environmental and state information can facilitate navigation, particularly when the UAV is operating in a semi-autonomous or fully autonomous manner and can be valuable for a wide variety of UAV functionalities.

Accordingly, the UAVs described herein can include one or more sensors configured to collect relevant data, such as information relating to the UAV state, the surrounding environment, or the objects within the environment. Based on the relevant data that is collected, it can be possible to generate control signals for controlling UAV navigation. Exemplary sensors suitable for use with the embodiments disclosed herein include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors can be used, such as one, two, three, four, five, six, seven, eight, or more sensors. Optionally, the data can be received from sensors of different types (e.g., two, three, four, five, six, seven, eight, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). In some instances, the local coordinate system may be a body coordinate system that is defined relative to the UAV.

The sensors can be configured to collect various types of data, such as data relating to the UAV, the surrounding environment, or objects within the environment. For example, at least some of the sensors may be configured to provide data regarding a state of the UAV. The state information provided by a sensor can include information regarding a spatial disposition of the UAV (e.g., location or position information such as longitude, latitude, and/or altitude; orientation or attitude information such as roll, pitch, and/or yaw). The state information can also include information regarding motion of the UAV (e.g., translational velocity, translation acceleration, angular velocity, angular acceleration, etc.). A sensor can be configured, for instance, to determine a spatial disposition and/or motion of the UAV with respect to up to six degrees of freedom (e.g., three degrees of freedom in position and/or translation, three degrees of freedom in orientation and/or rotation). The state information may be provided relative to a global coordinate system or relative to a local coordinate system (e.g., relative to the UAV or another entity). For example, a sensor can be configured to determine the distance between the UAV and the user controlling the UAV, or the distance between the UAV and the starting point of flight for the UAV.

The data obtained by the sensors may provide various types of environmental information. For example, the sensor data may be indicative of an environment type, such as an indoor environment, outdoor environment, low altitude environment, or high altitude environment. The sensor data may also provide information regarding current environmental conditions, including weather (e.g., clear, rainy, snowing), visibility conditions, wind speed, time of day, and so on. Furthermore, the environmental information collected by the sensors may include information regarding the objects in the environment, such as the obstacles described herein. Obstacle information may include information regarding the number, density, geometry, and/or spatial disposition of obstacles in the environment. For example, the obstacles mentioned herein may be captured by an imaging device coupled to the UAV. A processor coupled to the imaging device may process the captured images. For example, the processor may extract feature points within the image. The obstacles within a captured image may be described by feature points. The feature points may help in determining the existence of obstacles and aid in computer vision applications, such as obstacle avoidance of UAVs.

The systems, devices, and methods described herein can be applied to a wide variety of movable objects. As previously mentioned, any description herein of a UAV may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avians, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 9:
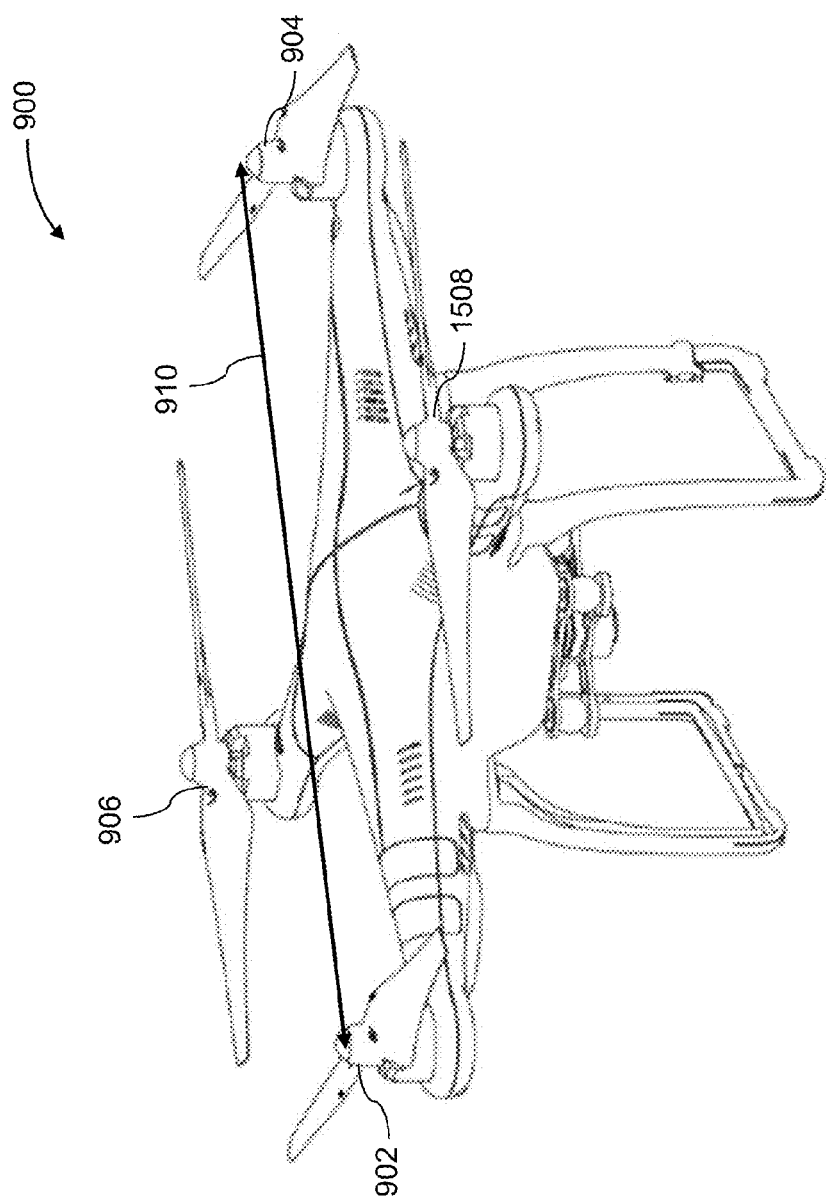
FIG. 9 illustrates an unmanned aerial vehicle (UAV), in accordance with embodiments.

FIG. 9 illustrates an unmanned aerial vehicle (UAV) 900, in accordance with embodiments. The UAV may be an example of a movable object as described herein. The UAV 900 can include a propulsion system having four rotors 902, 904, 906, and 908. Any number of rotors may be provided (e.g., one, two, three, four, five, six, seven, eight, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 910. For example, the length 910 can be less than or equal to 2 m, or less than equal to 5 m. In some embodiments, the length 910 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 10:
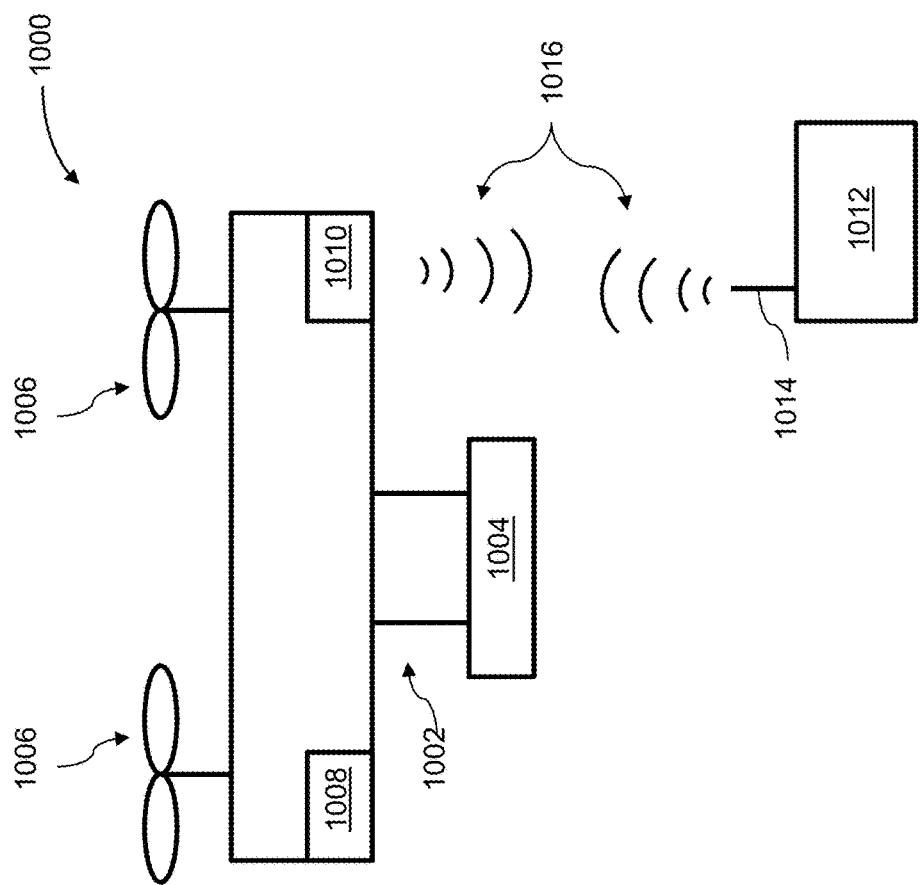
FIG. 10 illustrates a movable object including a carrier and a payload, in accordance with embodiments.

FIG. 10 illustrates a movable object 1000 including a carrier 1002 and a payload 1004, in accordance with embodiments. Although the movable object 1000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1004 may be provided on the movable object 1000 without requiring the carrier 1002. The movable object 1000 may include propulsion mechanisms 1006, a sensing system 1008, and a communication system 1010.

The propulsion mechanisms 1006 can include one or more of rotors, propellers, blades, engines, motors, wheels, axles, magnets, or nozzles, as previously described. For example, the propulsion mechanisms 1006 may be rotor assemblies or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1006 can be mounted on the movable object 1000 using any suitable means, such as a support element (e.g., a drive shaft) as described elsewhere herein. The propulsion mechanisms 1006 can be mounted on any suitable portion of the movable object 1000, such on the top, bottom, front, back, sides, or suitable combinations thereof.

In some embodiments, the propulsion mechanisms 1006 can enable the movable object 1000 to take off vertically from a surface or land vertically on a surface without requiring any horizontal movement of the movable object 1000 (e.g., without traveling down a runway). Optionally, the propulsion mechanisms 1006 can be operable to permit the movable object 1000 to hover in the air at a specified position and/or orientation. One or more of the propulsion mechanisms 1000 may be controlled independently of the other propulsion mechanisms. Alternatively, the propulsion mechanisms 1000 can be configured to be controlled simultaneously. For example, the movable object 1000 can have multiple horizontally oriented rotors that can provide lift and/or thrust to the movable object. The multiple horizontally oriented rotors can be actuated to provide vertical takeoff, vertical landing, and hovering capabilities to the movable object 1000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1000 (e.g., with respect to up to three degrees of translation and up to three degrees of rotation).

The sensing system 1008 can include one or more sensors that may sense the spatial disposition, velocity, and/or acceleration of the movable object 1000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1008 can be used to control the spatial disposition, velocity, and/or orientation of the movable object 1000 (e.g., using a suitable processing unit and/or control module, as described below). Alternatively, the sensing system 1008 can be used to provide data regarding the environment surrounding the movable object, such as weather conditions, proximity to potential obstacles, location of geographical features, location of manmade structures, and the like.

The communication system 1010 enables communication with terminal 1012 having a communication system 1014 via wireless signals 1016. The communication systems 1010, 1014 may include any number of transmitters, receivers, and/or transceivers suitable for wireless communication. The communication may be one-way communication, such that data can be transmitted in only one direction. For example, one-way communication may involve only the movable object 1000 transmitting data to the terminal 1012, or vice-versa. The data may be transmitted from one or more transmitters of the communication system 1010 to one or more receivers of the communication system 1012, or vice-versa. Alternatively, the communication may be two-way communication, such that data can be transmitted in both directions between the movable object 1000 and the terminal 1012. The two-way communication can involve transmitting data from one or more transmitters of the communication system 1010 to one or more receivers of the communication system 1014, and vice-versa.

In some embodiments, the terminal 1012 can provide control data to one or more of the movable object 1000, carrier 1002, and payload 1004 and receive information from one or more of the movable object 1000, carrier 1002, and payload 1004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1006), or a movement of the payload with respect to the movable object (e.g., via control of the carrier 1002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1008 or of the payload 1004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1012 can be configured to control a state of one or more of the movable object 1000, carrier 1002, or payload 1004. Alternatively or in combination, the carrier 1002 and payload 1004 can also each include a communication module configured to communicate with terminal 1012, such that the terminal can communicate with and control each of the movable object 1000, carrier 1002, and payload 1004 independently.

In some embodiments, the movable object 1000 can be configured to communicate with another remote device in addition to the terminal 1012, or instead of the terminal 1012. The terminal 1012 may also be configured to communicate with another remote device as well as the movable object 1000. For example, the movable object 1000 and/or terminal 1012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1000, receive data from the movable object 1000, transmit data to the terminal 1012, and/or receive data from the terminal 1012. Optionally, the remote device can be connected to the Internet or other telecommunications network, such that data received from the movable object 1000 and/or terminal 1012 can be uploaded to a website or server.

Figure 11:
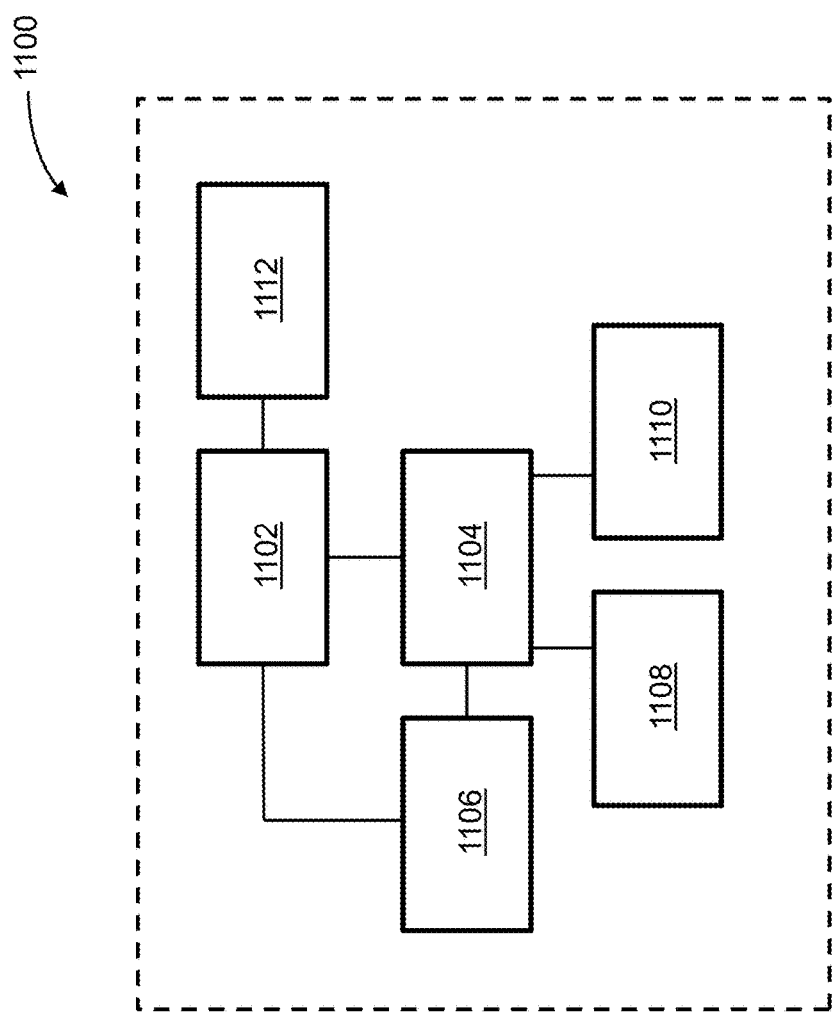
FIG. 11 illustrates a schematic illustration by way of block diagram of a system for controlling a movable object, in accordance with embodiments.

FIG. 11 is a schematic illustration by way of block diagram of a system 1100 for controlling a movable object, in accordance with embodiments. The system 1100 can be used in combination with any suitable embodiment of the systems, devices, and methods disclosed herein. The system 1100 can include a sensing module 1102, processing unit 1104, non-transitory computer readable medium 1106, control module 1108, and communication module 1110.

The sensing module 1102 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1102 can be operatively coupled to a processing unit 1104 having a plurality of processors. In some embodiments, the sensing module can be operatively coupled to a transmission module 1112 (e.g., a Wi-Fi image transmission module) configured to directly transmit sensing data to a suitable external device or system. For example, the transmission module 1112 can be used to transmit images captured by a camera of the sensing module 1102 to a remote terminal.

The processing unit 1104 can have one or more processors, such as a programmable processor (e.g., a central processing unit (CPU)). The processing unit 1104 can be operatively coupled to a non-transitory computer readable medium 1106. The non-transitory computer readable medium 1106 can store logic, code, and/or program instructions executable by the processing unit 1104 for performing one or more steps. The non-transitory computer readable medium can include one or more memory units (e.g., removable media or external storage such as an SD card or random access memory (RAM)). In some embodiments, data from the sensing module 1102 can be directly conveyed to and stored within the memory units of the non-transitory computer readable medium 1106. The memory units of the non-transitory computer readable medium 1106 can store logic, code and/or program instructions executable by the processing unit 1104 to perform any suitable embodiment of the methods described herein. For example, the processing unit 1104 can be configured to execute instructions causing one or more processors of the processing unit 1104 to analyze sensing data produced by the sensing module. The memory units can store sensing data from the sensing module to be processed by the processing unit 1104. In some embodiments, the memory units of the non-transitory computer readable medium 1106 can be used to store the processing results produced by the processing unit 1104.

In some embodiments, the processing unit 1104 can be operatively coupled to a control module 1108 configured to control a state of the movable object. For example, the control module 1108 can be configured to control the propulsion mechanisms of the movable object to adjust the spatial disposition, velocity, and/or acceleration of the movable object with respect to six degrees of freedom. Alternatively or in combination, the control module 1108 can control one or more of a state of a carrier, payload, or sensing module.

The processing unit 1104 can be operatively coupled to a communication module 1110 configured to transmit and/or receive data from one or more external devices (e.g., a terminal, display device, or other remote controller). Any suitable means of communication can be used, such as wired communication or wireless communication. For example, the communication module 1110 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1110 can transmit and/or receive one or more of sensing data from the sensing module 1102, processing results produced by the processing unit 1104, predetermined control data, user commands from a terminal or remote controller, and the like.

The components of the system 1100 can be arranged in any suitable configuration. For example, one or more of the components of the system 1100 can be located on the movable object, carrier, payload, terminal, sensing system, or an additional external device in communication with one or more of the above. Additionally, although FIG. 11 depicts a single processing unit 1104 and a single non-transitory computer readable medium 1106, one of skill in the art would appreciate that this is not intended to be limiting, and that the system 1100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1100 can occur at one or more of the aforementioned locations.

As used herein A and/or B encompasses one or more of A or B, and combinations thereof such as A and B.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system comprising:
   a non-transitory computer readable medium storing instructions; and
   a processor coupled to the non-transitory computer readable medium and configured to execute the instructions to:
   receive a plurality of images, wherein each of the plurality of images are captured using an image capture device under conditions that vary at least one parameter of the image capture device;
   perform an analysis of texture of each of the plurality of images;
   select one or more images from the plurality of images based on the analyzed texture of each of the plurality of images; and
   generate a signal to vary or maintain the parameter of the image capture device based on the analysis of the texture to yield a desired texture quality of a subsequent image;
   wherein the parameter is exposure time and/or gain of the image capture device, and the plurality of images are captured using different exposure times and/or different gains.

2. The system of claim 1, wherein performing an analysis of texture of each of the plurality of images comprises performing an analysis of feature points of each of the plurality of images.

3. The system of claim 1, wherein the plurality of images are captured by the image capture device within 0.5 seconds.

4. The system of claim 1, wherein the at least one parameter of the image capture device is varied a) by applying a positive or negative predetermined offset to the at least one parameter of the image capture device, or b) by multiplying or dividing the at least one parameter of the image capture device by a predetermined amount.

5. The system of claim 1, wherein the selected image(s) yields a desired texture quality relative to other images of the plurality of images.

6. The system of claim 5, wherein the image capture device is configured to capture a subsequent image using the same parameter of the image capture device that was used in capturing the selected image(s), and wherein the subsequent image is used in a computer vision process.

7. The system of claim 1, wherein the selected image(s) meets or exceeds a predetermined threshold condition, and wherein the predetermined threshold condition is determined based on a planned use of one or more of the plurality of images in a computer vision application.

8. The system of claim 1, wherein the selected image(s) meets or exceeds a predetermined threshold condition, and wherein the predetermined threshold condition includes a threshold number, distribution, or quality of feature points.

9. The system of claim 1, wherein the processor is further configured to execute the instructions to determine how the parameter of the image capture device is to be varied.

10. The system of claim 1, wherein the texture of the image is analyzed using a FAST or Harris corner detection algorithm.

11. The system of claim 1, wherein the image capture device is located on board an unmanned aerial vehicle (UAV).

12. A system comprising:
   a non-transitory computer readable medium storing instructions; and
   a processor coupled to the non-transitory computer readable medium and configured to execute the instructions to:
      receive an image captured by an image capture device;
      perform an analysis of texture of the image; and
      generate a signal to vary or maintain a parameter of the image capture device based on the analysis of the texture to yield a desired texture quality of a subsequent image;
   wherein the parameter is exposure time and/or gain of the image capture device.

13. The system of claim 12, wherein performing the analysis of texture of the image comprises performing an analysis of feature points of the image.

14. The system of claim 12, wherein the subsequent image is used in a computer vision process comprising navigation.

15. The system of claim 12, wherein the texture of the image is analyzed using a FAST or Harris corner detect algorithm.

16. The system of claim 12, wherein the image capture device is located on board an unmanned aerial vehicle (UAV).

17. The system of claim 12, wherein the processor is further configured to execute the instructions to determine how the parameter of the image capture device is to be varied or maintained using an AEC/AGC algorithm.

18. The system of claim 12, wherein the desired texture quality includes meeting and/or exceeding a predetermined threshold condition, and wherein the predetermined threshold condition is determined based on a planned use of the image or the subsequent image in a computer vision application.

19. The system of claim 12, wherein the desired texture quality includes meeting and/or exceeding a predetermined threshold condition, and wherein the predetermined threshold condition includes a threshold number, distribution, or quality of feature points.

* * * * *